United States Patent
Peine et al.

(10) Patent No.: US 9,718,315 B2
(45) Date of Patent: Aug. 1, 2017

(54) DEVICE AND METHOD USING PASSIVE ELEMENT TO INFLUENCE SIGNAL BASED ON TIRE CHARACTERISTIC

(71) Applicant: Infineon Technologies AG, Neubiberg (DE)

(72) Inventors: Andre Peine, Munich (DE); Thomas Lange, Munich (DE)

(73) Assignee: Infineon Technologies AG, Neubiberg (DE)

(*) Notice: Subject to any disclaimer, the term of this patent is extended or adjusted under 35 U.S.C. 154(b) by 25 days.

(21) Appl. No.: 14/807,994

(22) Filed: Jul. 24, 2015

(65) Prior Publication Data

US 2016/0031272 A1   Feb. 4, 2016

(30) Foreign Application Priority Data

Aug. 1, 2014  (DE) .................. 10 2014 110 936

(51) Int. Cl.
| | |
|---|---|
| G08B 21/00 | (2006.01) |
| B60C 23/04 | (2006.01) |
| B60C 23/06 | (2006.01) |
| B60C 23/20 | (2006.01) |
| B60C 11/24 | (2006.01) |

(52) U.S. Cl.
CPC ........ B60C 23/0408 (2013.01); B60C 11/243 (2013.04); B60C 11/246 (2013.04); B60C 23/0437 (2013.01); B60C 23/0449 (2013.01); B60C 23/0452 (2013.01); B60C 23/0483 (2013.01); B60C 23/0493 (2013.01); B60C 23/061 (2013.01); B60C 23/20 (2013.01)

(58) Field of Classification Search
CPC .. B60C 11/243; B60C 11/246; B60C 23/0408
USPC ........................................... 340/442
See application file for complete search history.

(56) References Cited

U.S. PATENT DOCUMENTS

| | | | | |
|---|---|---|---|---|
| 4,075,632 | A | * | 2/1978 | Baldwin .............. A01K 29/005 340/870.01 |
| 5,977,870 | A | | 11/1999 | Rensel et al. |
| 6,469,621 | B1 | * | 10/2002 | Vredevoogd ....... B60C 23/0408 340/442 |
| 7,427,915 | B2 | | 9/2008 | Ogawa et al. |
| 7,719,406 | B2 | * | 5/2010 | Bajahr ................ B60C 23/0413 340/10.1 |
| 2003/0234722 | A1 | | 12/2003 | Lonsdale et al. |

(Continued)

FOREIGN PATENT DOCUMENTS

| | | |
|---|---|---|
| DE | 19745734 A1 | 4/1999 |
| DE | 102007053153 A1 | 5/2009 |
| DE | 102011057031 A1 | 6/2013 |

*Primary Examiner* — Mark Rushing
(74) *Attorney, Agent, or Firm* — Eschweiler & Potashnik, LLC (57) ABSTRACT

Embodiments provide a device, an element, a passive element, methods and computer programs for obtaining tire characteristics. A device includes a transmitter inside a tire to transmit a signal at least partially indicating a first characteristic of the tire. The device further includes a passive element to at least partially influence the signal based on a second characteristic of the tire. The device further includes an element to detect the influence of the signal by the passive element and to obtain information related to the second characteristic of the tire based on the influence.

22 Claims, 4 Drawing Sheets (56) References Cited

U.S. PATENT DOCUMENTS

| | | |
|---|---|---|
| 2004/0021562 A1 | 2/2004 | Prenninger |
| 2005/0110614 A1* | 5/2005 | Coates .............. G06K 19/0672 |
| | | 340/10.41 |
| 2007/0064838 A1* | 3/2007 | Anderson ........... B60C 23/0408 |
| | | 375/329 |
| 2007/0080795 A1 | 4/2007 | Ichikawa et al. |
| 2009/0072958 A1 | 3/2009 | Hammerschmidt et al. |
| 2011/0221587 A1* | 9/2011 | Katou ................. B60C 23/0408 |
| | | 340/443 |
| 2013/0289823 A1 | 10/2013 | Boss et al. |

* cited by examiner

DEVICE AND METHOD USING PASSIVE ELEMENT TO INFLUENCE SIGNAL BASED ON TIRE CHARACTERISTIC

CROSS REFERENCE TO RELATED APPLICATIONS

This application claims priority to German Application No. 102014110936.8, filed on Aug. 1, 2014, and incorporated herein by reference in its entirety.

FIELD

Embodiments relate to a device, an element, a passive element, methods and computer programs for obtaining tire characteristics.

BACKGROUND

Tire Pressure Monitoring Systems (TPMS) are designed to monitor the air pressure inside of pneumatic tires on various types of vehicles. Therefore pressure sensors are used in the tires and the system may report the tire pressure information to the driver of the vehicle. Wireless transmission can be used to transmit information on the pressure data to a centralized receiver component in the vehicle. Such a configuration can enable the system to report or signal pressure losses of the tires to the driver. Some known TPMSs provide localization information on the tire or wheel on top of pressure information so as to indicate to a driver of a vehicle the position of a wheel having a pressure loss. Tire pressure is one out of many characteristics of a tire, which might be useful for comfort or for safety reasons, other characteristics may be tire temperature, accelerations, friction, deformations, condition of tire tread, etc.

For tire tread measurements a mileage counter may be used in some vehicles. Such a concept may count a number of revolutions or rotations of a tire and estimate an overall mileage of the tire. The wear or use of a tire tread may also depend on other factors such as style of driving (accelerations, braking behavior, high speed portion, etc.) and condition of the road surface, which may render an estimation based on a mileage of tire imprecise. Another concept may use accelerations of a running tread or contact area of the tire to obtain information on the condition of the tire tread. The condition of the tire tread may further depend on the material thickness of the tire or contact area. Furthermore, acceleration measurements may make use of complex measurement circuits and actual accelerations may depend on further parameters such as the age and temperature of the rubber material of the tire, which may distort absolute results of acceleration measurements.

SUMMARY

Embodiments provide a device, an element, a passive element, methods and computer programs for obtaining tire characteristics. Embodiments may in general enable to provide information related to several tire characteristics to a driver or control unit of a vehicle. For example, the control unit may control and adapt parts of the vehicle such as a damping system of the car based on information related to tire characteristics. For example, embodiments may enable to warn a driver of a vehicle when a wear of a tire tread becomes critical, for example, when a tire tread wears off below a certain threshold. Some embodiments may enable to inform a driver or control unit of a vehicle about a state of a tire tread, e.g. on an intermediate state such as a degree of a wear down of a tire tread. Moreover, embodiments may enable a synergy effect between multiple sensor systems or systems to provide information related to tire characteristics in a vehicle.

Embodiments provide a device, which comprises a transmitter inside a tire to transmit a signal at least partially indicating a first characteristic of the tire. The device further comprises a passive element to at least partially influence the signal based on a second characteristic of the tire. The device further comprises an element to detect the influence of the signal by the passive element and to obtain information related to the second characteristic of the tire based on the influence. Embodiments may allow a passive element transmitting second tire characteristics by influencing a signal transmitting first tire characteristics. Embodiments may enable to make a more efficient use of signals being transmitted from an inside of a tire to an outside of a tire by letting other components influence an already existing signal.

In embodiments, the first characteristic and the second characteristic are different. Embodiments may enable provision or transmission of different characteristics of a tire. The first characteristic and the second characteristic may each comprise at least one element of the group of information related to a tire pressure, information related to a condition of a tire tread, information related to a tire temperature, information related to an acceleration of the tire, information related to a friction of the tire, information related to a modulus of elasticity of the tire, information related to a modulus of torsion of the tire, information related to a bulk modulus of the tire, etc. A plurality of different characteristics of the tire may be made available for analysis or reporting such that embodiments may allow for improved comfort or safety in a vehicle. In some embodiments the transmitter may be coupled to the element and/or the transmitter may comprise a tire pressure sensor module. For example, in some embodiments the transmitter of the signal may comprise the element to detect the influence, e.g. a characteristic wave impedance may be influenced or changed by the passive element, which may be detected at the transmitter. Embodiments may enable an efficient implementation of the device with the transmitter comprising the element such that the transmitter may detect the influence on the transmitted signal, e.g. in a tire pressure sensor module.

In further embodiments the element may comprise the tire pressure sensor module. The first characteristic may then comprise information related to a tire pressure and the element may be configured to detect a load modulation on the transmit signal based on which the information related to the second characteristic is obtained, and the second characteristic may comprise information related to a condition of a tire tread of the tire. Embodiments may allow a passive tire tread element or sensor to influence a TPMS signal such the information related to the condition of the tire tread may be transmitted taking advantage of the anyway transmitted TPMS signal.

In some embodiments the element comprises a control unit for a vehicle the tire is attached to. In some embodiments the control unit of a vehicle may detect the influence on the signal transmitted by the transmitter and hence detect information related to the second characteristic. In some embodiments the transmitter might not even take notice on the influence on the transmit signal as the element to detect the influence may be located at a control unit separated from the transmitter, e.g. within the vehicle comprising the tire or at a service station.

Embodiments further provide an element to detect an influence evoked by a passive element on a transmit signal transmitted by a transmitter from inside a tire. The transmit signal at least partially indicates a first characteristic of the tire. The influence of the signal is based on a second characteristic of the tire. The element is configured to obtain information related to the second characteristic of the tire based on the influence. Embodiments may enable a transmitter to detect the influence, e.g. when the element is comprised in or coupled to the transmitter. Some embodiments may enable detection of the influence or information related to the second characteristic at a control unit comprising the element.

In line with the above, the first characteristic and the second characteristic may be different. The first characteristic and the second characteristic may each comprise at least one element of the group of information related to a tire pressure, information related to a condition of a tire tread, information related to a tire temperature, information related to an acceleration of the tire, information related to a friction of the tire, information related to a modulus of elasticity of the tire, information related to a modulus of torsion of the tire, or information related to a bulk modulus of the tire. For example, in some embodiments the first characteristic may comprise information related to a tire pressure of the tire and the second characteristic may comprise information related to at least one element of the group of information related to a condition of a tire tread, information related to a tire temperature, information related to an acceleration of the tire, information related to a friction of the tire, information related to a modulus of elasticity of the tire, information related to a modulus of torsion of the tire, or information related to a bulk modulus of the tire. As described above the element may comprise the transmitter to transmit the signal from inside a tire. In some embodiments the element may comprise a tire pressure sensor module, and/or the transmitter may be further configured to transmit the information related to the second characteristic using a subsequent transmit signal.

The element may be further configured to sense the influence of the transmit signal based on a modulation of the transmit signal. Embodiments may enable efficient information transmission for the second characteristic as the transmit signal may be modulated, e.g. in terms of amplitude and/or frequency. As has been described above, the element may comprise a control device for a vehicle the tire is attached to. The control device may be configured to obtain information related to the first characteristic based on the transmit signal from the transmitter inside of the tire. The control device may be configured to obtain information related to the second characteristic based on the influence.

Embodiments further provide a passive element to at least partially influence a signal transmitted by a transmitter inside a tire. The transmit signal at least partially indicates a first characteristic of the tire and the influence of the signal is based on a second characteristic of the tire. The passive element may hence influence a signal, which is already or anyway transmitted. The passive element may be configured to sense information related to a condition of a tire tread and the second characteristic may comprise the information related to the condition of the tire tread and/or the first characteristic may comprise information related to a tire pressure. According to the above, the passive element may comprise a sensor such as tire thread or temperature sensor and influence the transmit signal accordingly.

In some embodiments the passive element comprises a Radio Frequency IDentification (RFID) tag, a Surface Acoustic Wave (SAW) filter or a Bulk Acoustic Wave (BAW) filter. Embodiments may make use of passive structures such as RFID or one of the above filters, which may take their energy or power supply from a surrounding electrical or magnetic field, such as the field generated by the transmitter by means of the transmit signal. The passive element may be configured to influence the signal using load modulation of the signal transmitted by the transmitter inside the tire. For example, the passive element may be implemented as an RFID tag, being excited by the field generated through the transmit signal, and then load modulate the transmit signal by means of absorbing some energy from the transmit signal. Such load modulation may then result in a sort of amplitude modulation, which can in turn be detected through the element, be it at the transmitter itself or at a control unit. The passive element may comprise an antenna, coil or loop. The passive element may further comprise a structure within a tread of the tire.

In embodiments the structure may comprise an electric or magnetic component, which is configured to influence an electric or a magnetic field of the signal transmitted by the transmitter inside of the tire. The structure may be configured to change with a change of the wear of the tire. For example, the structure may be configured to wear off at least partly together with the tread of the tire and/or the structure may be configured to completely wear off before the tire tread wears off completely. Embodiments may enable simple detection and information provision on a tire tread, as the influence on the transmit signal may depend on the wear of the structure and at least in some embodiments, when the structure wears off the influence may reduce or even be basically zero such that simple detection may be enabled. The passive element may be configured to at least partially modulate the signal of the transmitter inside the tire in a first wear condition of a tire tread using a first degree of modulation and to at least partially modulate the signal of the transmitter inside the tire in a second wear condition of the tire tread using a second degree of modulation. The first degree of modulation may be higher than the second degree of modulation or the second degree of modulation may equal basically zero.

Embodiments further provide a method for communicating information related to a condition of a tread of a tire. The method comprises influencing a radio signal transmitted by a transmitter inside of the tire with a first intensity in a first time period. The transmit signal at least partially indicates a characteristic of the tire different from the condition of the tread of the tire. The method further comprises influencing the radio signal with a second intensity in a second time period, and detecting information related to the condition of the tread of the tire based on the first and second intensities. Embodiments may enable efficient transmission of information related to a second characteristic of the tire using a transmit signal transmitting information related to the first characteristic of the tire. In some embodiments the second intensity may basically be zero.

Embodiments further provide a method to obtain information related multiple characteristics of a tire. The method comprises transmitting a signal at least partially indicating a first characteristic of the tire. The method further comprises at least partially influencing the signal based on a second characteristic of the tire. The method further comprises detecting the influence of the signal and obtaining the information related to the second characteristic of the tire based on the influence.

Embodiments further provide a computer program having a program code on a non-transitory media for performing, when the computer program is executed on a computer or on a processor, one of the above methods. In general, embodiments also provide one or more computer programs having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

Embodiments further provide a vehicle or tire comprising a device, element or passive element as described above.

BRIEF DESCRIPTION OF THE DRAWINGS

Some other features or aspects will be described using the following non-limiting embodiments of apparatuses and/or methods and/or computer programs by way of example only, and with reference to the accompanying figures, in which.

DETAILED DESCRIPTION

In the following some components will be shown in multiple figures, where consistent reference signs refer to functionally identical or similar components. Repetitive descriptions may be avoided for simplicity purposes. Features or components depicted in dotted lines are optional.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
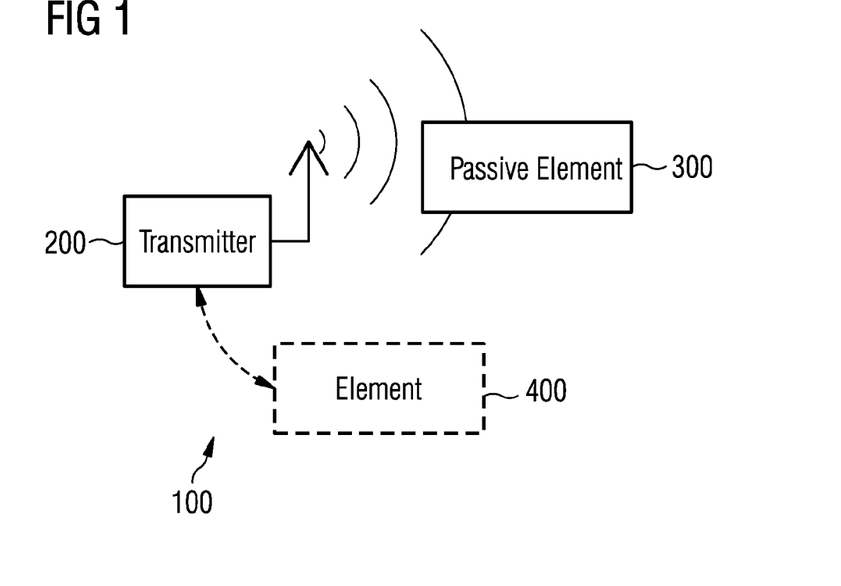
FIG. 1 shows a block diagram of an embodiment of a device comprising an embodiment of a transmitter, an embodiment of a passive element and an embodiment of an element.

FIG. 1 shows block diagrams of an embodiment of a device 100 comprising an embodiment of a transmitter 200, an embodiment of a passive element 300 and an embodiment of an element 400. The device 100 comprises the transmitter 200 inside a tire to transmit a signal at least partially indicating a first characteristic of the tire.

The transmitter 200 may be configured to wirelessly transmit information related to the first characteristic to, for example, a control unit of a vehicle or service station, for example an Electronic Control Unit (ECU), which may, at least in some embodiments comprise the element 400 as will be detailed subsequently. The transmitter 200 may be implemented as or comprise one or more modules, devices, means for transmitting, or units comprising transmitter or transceiver components such as typical transmitter and/or receiver components. Such components may include one or more components of the group of one or more transmit and/or receive antennas, one or more transmit and/or receive loops or coils, one or more low noise amplifiers, one or more power amplifiers, one or more filters, one or more duplexers or diplexers, one or more analog-digital and/or digital-analog converters, etc.

As shown in FIG. 1, the device 100 further comprises the passive element 300 to at least partially influence the signal based on a second characteristic of the tire. Embodiments may also provide the passive element 300 to at least partially influence the signal transmitted by the transmitter 200 inside the tire. The transmit signal at least partially indicates the first characteristic of the tire and the influence of the signal is based on the second characteristic of the tire. A partial influence or indication may, for example, correspond to a discontinuous influence or indication, which may depend on protocol used in embodiments. For example, in some embodiments the first characteristic may be indicated in certain time slot or frame of the transmit signal, while other time slot or frame of the transmit signal may have no indication of the first characteristic, for example, a plain carrier may be transmitted carrying no or control data may be transmitted. Additionally or alternatively, different frequencies or carriers in the transmit signal may be used to transmit the information related to the first characteristic, which may be discontinuous on one or more of the used frequencies. The passive element 300 may be implemented without a permanent energy source, such as a battery or an accumulator. The passive element 300 may comprise means to influence the transmit signal, for example, it may comprise electric or magnetic material which interacts with an electrical or magnetic field so to take the influence. For example, the passive element 300 may comprise an antenna, coil or loop. As will be detailed subsequently the passive element 300 may, for example, comprise a RFID identification tag, an SAW filter or a BAW filter. Such implementations or components may be powered by energy supplied by the transmitter or any other transmitter or field generator. The generated field may correspond to an electrical or a magnetic field. For example, the antenna, loop or coil may be used to couple to such a generated field and use the absorbed energy to power the passive element 300. The passive element 300 may be configured to influence the signal transmitted by the transmitter 200 using modulation, e.g. amplitude, frequency or load modulation, of the signal transmitted by the transmitter 200 inside the tire.

The device 100 further comprises an element 400 to detect the influence of the signal by the passive element 300 and to obtain information related to the second characteristic of the tire based on the influence, as also depicted in FIG. 1. Embodiments also provide the element 400 to detect the influence evoked by the passive element 300 on the transmit signal transmitted by the transmitter 200 from inside the tire. The transmit signal at least partially indicates the first characteristic of the tire. The influence of the signal is based on the second characteristic of the tire. The element 400 is configured to obtain information related to the second characteristic of the tire based on the influence. FIG. 1 illustrates that the signal transmitted by transmitter 200 is influenced by the passive element 300 and the influence is detected by element 400. Transmitter 200, passive element 300 and element 400 may form an embodiment of the device 100. Embodiments may also provide a system or a vehicle comprising such a device 100.

Embodiments may enable to take advantage of a signal transmitting information related to the first characteristic, by influencing the signal based on a second characteristic. In embodiments the first characteristic and the second characteristic may be different. The first characteristic and the second characteristic may each comprise at least one element of the group of information related to a tire pressure, information related to a condition of a tire tread, information related to a tire temperature, information related to an acceleration of the tire, information related to a friction of the tire, information related to a modulus of elasticity of the tire, information related to a modulus of torsion of the tire, or information related to a bulk modulus of the tire. Accordingly one or more sensors or sensor elements may be used in embodiments to sense according information.

Embodiments may take advantage of regulations or legal requirements at least in some countries. Regulations on requirements become existent in more and more countries, an example of which is TPMS or tire pressure information as the first tire characteristic. Automotive manufacturers may tend to provide TPMS as standard equipment. Embodiments may enable to provide additional information with the first characteristic, e.g. a TPMS signal, and may therefore enable a more efficient transmission concept for in-tire transmissions, make further or second information relating to tire characteristics and/or driving dynamics available, respectively. For example, information related to wear or depth of a tire tread may be used to generate warnings to a driver or control unit of a vehicle when a critical threshold for the tread is fallen below. Embodiments may complement existing transmission systems for tires such as TPMS.

Figure 2:
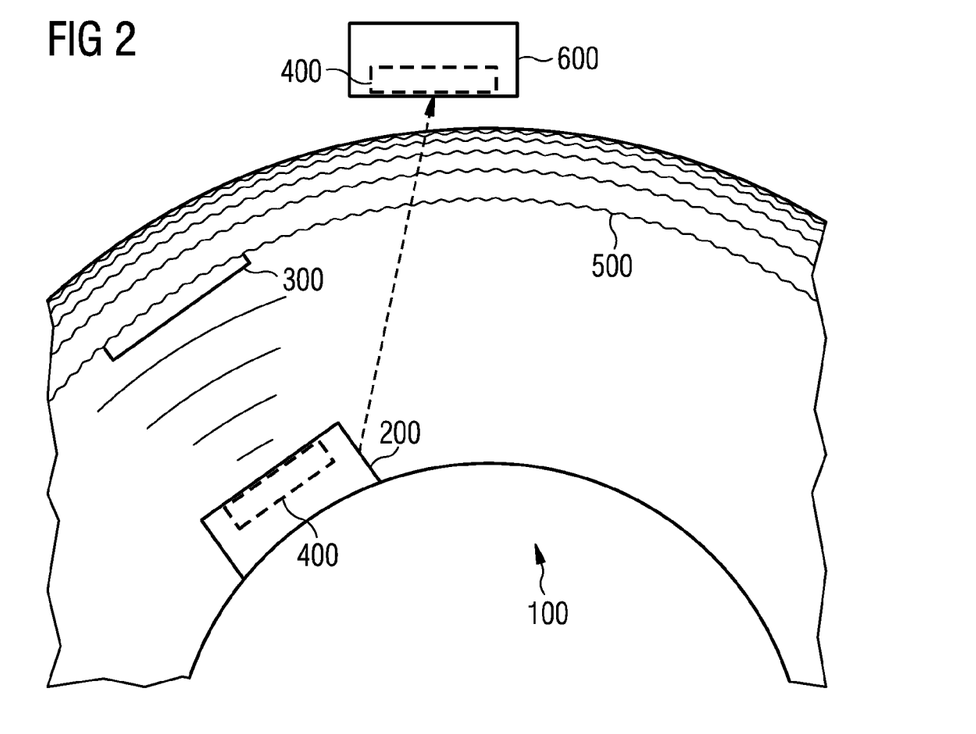
FIG. 2 illustrates an embodiment of a tire with an embodiment of a device comprising an embodiment of a transmitter, an embodiment of a passive element and an embodiment of an element.

FIG. 2 illustrates an embodiment of a tire 500 with an embodiment of a device 100 comprising an embodiment of a transmitter 200, an embodiment of a passive element 300 and two alternatives of embodiments of an element 400. As indicated by the dashed lined boxes the element 400 may be comprised in or coupled to the transmitter 200 or a control unit 600, which may be comprised in the vehicle, e.g. in an ECU, or in a service station. Embodiments may enable a service station, for example at a repair shop, garage, a technical inspection agency, a gate of a parking area, etc., to obtain information related to the first and second characteristics of the tire. Embodiments may enable automated maintenance plans or technical inspection support based on the first and second tire characteristics, for example in terms of tire pressure monitoring or inspection, and tire replacement based on tire tread wear or deterioration. Embodiments may enable automated maintenance concepts for utility or commercial vehicles. For example, public transportation vehicles, e.g. busses or school busses, may require frequent, e.g. daily, weekly, monthly, monitoring of tire characteristics and embodiments may enable such control, e.g. tire pressure and tire tread, on an automated basis.

For example, automated readings or transmissions may be enabled in parking areas, parking lots of forwarding or truckage companies or agents, at entries or exits thereto, etc. Embodiments may enable control of multiple tire characteristics on a plurality of vehicles, e.g. a fleet of vehicles, as information on multiple tire characteristics may be obtained using the transmit signal. Such information may be obtained using a manual control unit e.g. portable device, or using fixed installations of, for example, coils, loops, antennas, etc. As has been described above, in some embodiments the transmitter 200 is coupled to the element 400. For example, the transmitter 200 may sense or detect the influence of the passive element 300 by measuring or sensing a signal, such as a voltage or current, in its transmission path, e.g. at an amplifier. Such a signal may indicate or reflect changes in the transmitted field, e.g. changes in the wave propagation impedance. In a first embodiment depicted in FIG. 2 the transmitter 200 may comprise a tire pressure sensor module/TPMS and the element 400. The element 400 may comprise the tire pressure sensor module and/or the transmitter 200 to the transmit the signal from inside the tire 500. The first characteristic comprises information related to a tire pressure, for example as provided by the TPMS.

In the following a vehicle may comprise the tire 500, and a vehicle can be any vehicle using tires 500, as, for example, a car, a van, a truck, a bus, a plane, a bike, a motorbike, etc. Although, some embodiments may be exemplified using a car, any other vehicles can be utilized in embodiments. The tire 500 is outlined as a sketch in FIG. 2. The tire pressure sensor module comprises the transmitter 200 may be located next to the inner opening of the tire 200, for example close to a potential rim or valve of the vehicle in some embodiments. The tire pressure sensor module may comprise a pressure sensor, which is configured to determine the information related to the pressure of the tire 500. The pressure sensor may comprise one or more pressure sensing elements, one or more pressure detectors, one or more pressure units, etc. The pressure sensor may be configured to determine any signal or information, which may be analog or digital, related to the pressure of its surrounding, for example of the tire 500, when the pressure sensor is mounted or coupled thereto.

The pressure sensor module, the transmitter 200, respectively, may comprise a controller, or any means for controlling, which is configured to operate one or more components of the transmitter 200. The tire pressure sensor module may hence wirelessly communicate with a receiver module, located outside the tire 500 or wheel, for example an ECU of a vehicle or a service station. In embodiments the controller may comprise or be coupled to a sensor, which may, for example in terms of an acceleration sensor, determine further information related one of the above tire characteristics, e.g. to the velocity, for example represented by one or more signals comprising information related to speed, rotational frequency, radial or tangential acceleration, etc. of the tire 500. The transmitter 200 may comprise one or more sensors or sensor elements to determine the first tire characteristic. FIG. 2 also illustrates the passive element 300, which may likewise be located at different positions in the tire and which may comprise one or more sensors or sensor elements to sense or obtain information related to the second tire characteristic. In the embodiment shown in FIG. 2 the passive element 300 is located at the back of a contact area of the tire 500 or may even be embedded in the tire tread.

According to an embodiment in line with FIG. 2, the first characteristic comprises information related to a tire pressure of the tire and the second characteristic comprises information related to at least one element of the group of information related to a condition of a tire tread, information related to a tire temperature, information related to an acceleration of the tire, information related to a friction of the tire, information related to a modulus of elasticity of the tire, information related to a modulus of torsion of the tire, or information related to a bulk modulus of the tire. The passive element 300 may hence comprise one or more tread sensing devices, one or more temperature sensors or sensing elements, one or more acceleration sensors or sensing elements which may sense different accelerations with different orientations, one or more strain gauges etc.

In a more detailed embodiment the first characteristic corresponds to information related to the tire pressure and the second characteristic correspond to information related to a condition of the tire tread. Some embodiments may enable to obtain information related to a tire tread depth, wear or abrasion of a tire tread, e.g. in comparison with a given threshold. Some embodiments may provide further information such as information related to a current degree of the tire tread depth, wear or abrasion of a tire tread. For example, some embodiments may detect when a minimum value for tire tread depth, wear or abrasion of a tire tread is reached such that an according tire change indication may be provided in a vehicle, to a driver, control unit or service station, respectively. Intermediate values or degrees thereof may be continuously provided alternatively or additionally. The passive element 300 is then configured to sense information related to a condition of a tire tread and the second characteristic comprises the information related to the condition of the tire tread. The first characteristic then comprises information related to a tire pressure.

In an embodiment a TPMS comprising the transmitter 200 may obtain pressure and/or temperature information and use High or Radio Frequency (HF/RF) signal to transmit them, for example using the Industrial, Scientific and Medical (ISM) radio bands below 1 GHz. The passive element 300 is positioned in the tire 500 next to the contact area, for example at the position also corresponding to a minimal tread depth or pattern, which is still acceptable. The passive element 300 then influences the RF signal in a way that the TPMS or transmitter 200 comprising the element 400 may detect whether the passive element 300 is still there or not.

Figure 3:
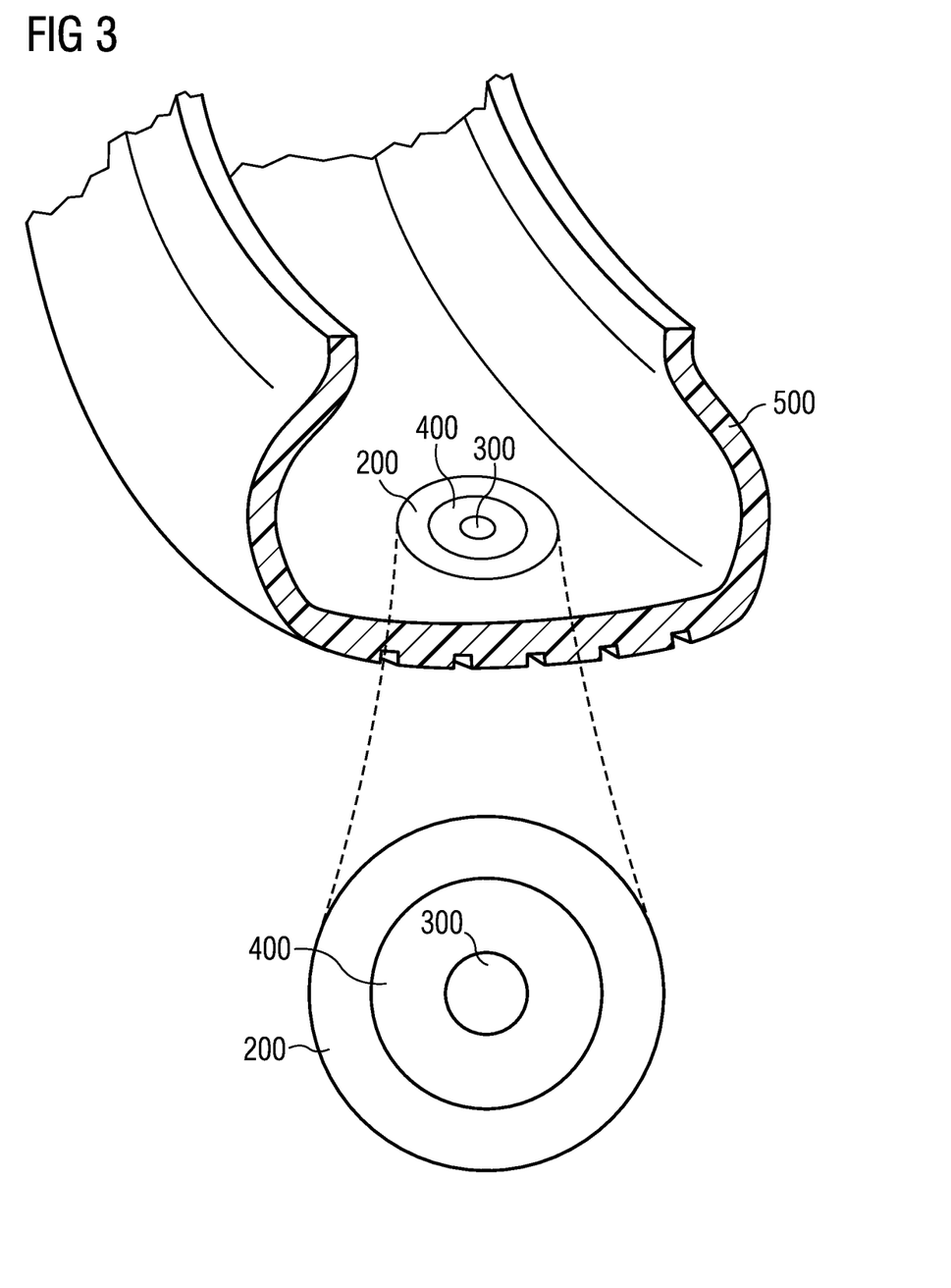
FIG. 3 shows embodiments of a passive element, a transmitter and an element in an in-tire implementation.

FIG. 3 shows embodiments of a passive element 300, a transmitter 200 and an element 400 in an in-tire implementation. Some embodiments may use an in-tire system as depicted in FIG. 3; some embodiments may use implementations of a TPMS or the transmitter 200 at a valve of a tire or at any other place in the tire 500. FIG. 3 shows an embodiment of a transmitter 200 comprised in a tire pressure sensor module or TPMS. FIG. 3 shows the TPMS and its mounting or position in or at the tire 500 at the top. At the bottom FIG. 3 shows a magnification of the TPMS with the passive element 300 in the center and the element 400 surrounding the passive element 300 and the transmitter 200 surrounding the passive element 300 in a projection in a concentric setup, where other embodiments may use other setups or geometries.

Figure 4:
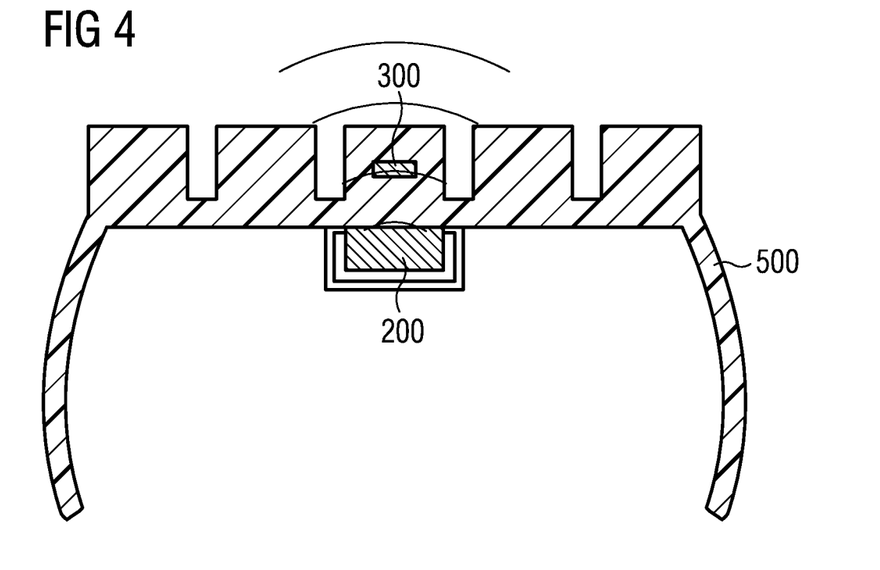
FIG. 4 shows embodiments of a passive element as tire tread sensor and a transmitter in a TPMS.

FIG. 4 shows the embodiments of the passive element 300 as tire tread sensor and a transmitter 200 in the TPMS from a sectional view. From FIG. 4 it can be seen that the passive element 300 is located in the tire tread of the tire 500 above the transmitter 200 an influencing the transmissions. For ease of presentation the element 400 is not shown in FIG. 4. In the present embodiment the element 400 can be assumed to be located on top of the transmitter 200 or between the transmitter 200 and the passive element 300 such that the projection shows the concentric setup depicted in FIG. 3.

The interfaces between the transmitter 200 and the element 400 may, for example, be implemented along the circular inner edge of the transmitter 200, the circular outer edge of the element 400, respectively. FIG. 3 shows an embodiment in which the in-tire TPMS or transmitter 200 is combined with the element 400. The system, the transmitter 200 and the element 400, respectively, may be mounted into a pocket at the inner surface of the tire 500 (backside of the contact surface). In other embodiments the system may be laminated into the tire material, for example, on the backside of the contact surface or in the material between the contact surface and its backside. An electrical coupling between the two components may therefore be efficiently implemented. An energy harvester may be comprised in the TPMS and may provide power for the TPMS or transmitter 200.

The TPMS or transmitter 200 may comprise a microcontroller and a Radio Frequency (RF) interface to a control device 600 of the vehicle or service station in line with the above description and as depicted in FIG. 2. The transmitter 200 may hence pre-process or process the information or data obtained and provide such information or data to the vehicle or service station, its control device 600, respectively. It is to be noted that the transmitter 200 may comprise or be coupled to multiple sensors, which may be coupled to each other. For example, the transmitter 200 may further comprise or be coupled to a valve mounted pressure sensor. In the embodiment illustrated in FIGS. 3 and 4 the transmitter 200 is located or laminated into a pocket on the backside of the contact area of the tire 500. In in a tread section above the pocket, or next to it, respectively, the passive element 300 is located at a position in the tire tread, which corresponds to the above description.

As shown in FIG. 4 when the abrasion of the tire tread reaches a certain level or degree, e.g. undergoing the minimal acceptable requirement, the passive element 300 gets worn off too, e.g. it gets detached or uncoupled from the tire 500. Therewith the influence on the RF-Signal from the TPMS or transmitter 200 changes, which can be detected, e.g. by the TPMS or transmitter 200 itself and a warning or a message can be issued to a driver of the vehicle, to control unit 600 of the vehicle, respectively.

Figure 5:
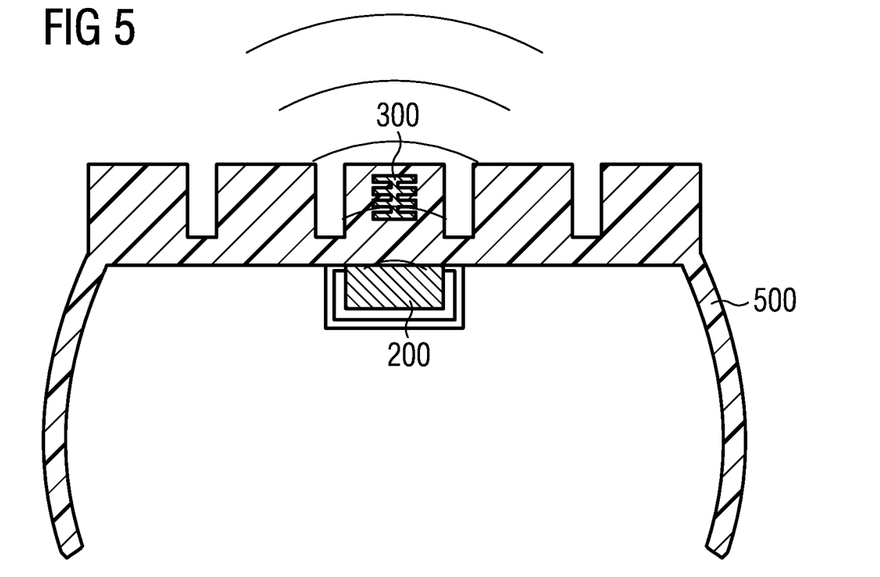
FIG. 5 shows further embodiments of a passive element as tire tread sensor and a transmitter in a TPMS.

Additionally, the passive element 300 may be structured in a way that further structural elements are located above the minimal tread depth such that they can get worn off earlier than the entire passive element 300. FIG. 5 shows further embodiments of a passive element 300 as tire tread sensor and a transmitter 200 in a TPMS. FIG. 5 illustrates a tire 500 with an according tire tread comprising a passive element 300, located next to a transmitter 200, which can be comprised in a TPMS in line with the above. The passive element 300 comprises a structure within a tread of the tire 500. The structure may comprise an electric or magnetic component, which is configured to influence the electric or a magnetic field of the signal transmitted by the transmitter 200 inside of the tire 500. As can be seen from FIG. 5 the structure is configured to change with a change of the wear of the tire 500. The structure is configured to wear off at least partly together with the tread of the tire 500 and the structure is configured to completely wear off before the tire tread wears off completely.

In the embodiment depicted in FIG. 5, as the tire tread depth decreases, more and more structural elements or more and more of the passive element's structure gets worn off, which changes the influence on the RF-signal. For example, the RF-signal may depend on a number of structural elements which are still present in the tire tread, which can be evaluated or detected by an element 400 in the transmitter 200 or TPMS and can be informed to a driver or control unit 600. The passive element may be configured to at least partially modulate the signal of the transmitter 200 inside the tire 500 in a first wear condition of a tire tread using a first degree of modulation, and to at least partially modulate the signal of the transmitter 200 inside the tire 500 in a second wear condition of the tire tread using a second degree of modulation. The first degree of modulation is higher than the second degree of modulation or the second degree of modulation may equal basically zero.

Embodiments may enable detection of a profile depth, tread depth or pattern depth of a tire 500. In some embodiments minimal depth detection may be enabled, e.g. as shown in FIG. 4, in some embodiments intermediate depth value detection or a stepwise depth detection may be enabled, e.g. as shown in FIG. 5.

For example, when operative a TPMS transmitter 200 may regularly transmit measured pressure and optionally temperature information to a receiver at a vehicle, e.g. a receiver coupled with an Electronic Control Unit (ECU) 600 of the vehicle or service station. The passive element 300 in the tire tread influences the transmit signal from the TPMS transmitter 200. In some embodiments this may be carried out as a transmission and the receiver of the vehicle, service station or ECU 600 may detect the influence or the presence of the passive element 300. Hence, the element 400 comprises or may be comprised in a control unit or device 600 for a vehicle the tire 500 is attached to, service station, respectively. Such an embodiment is also depicted in FIG. 2, where the dashed lined box indicates that the element 400 may as well be located at the control unit 600. The control unit or device 600 is then configured to obtain information related to the first characteristic, e.g. tire pressure information, based on the transmit signal from the transmitter 200 inside of the tire 500. The control unit or device 600 is then further configured to obtain information related to the second characteristic, e.g. information related to the tire tread, based on the influence. The element 400, be it comprised or coupled to the transmitter 200, the control unit 600 or both, is then configured to sense the influence of the transmit signal, for example, based on a modulation of the transmit signal.

As described above, in some embodiments the influence may be detected as a reflection and/or reception and the transmitter 200 itself may detect or measure the influenced signal, comprising the element 400. The element 400 may then comprise or be comprised in the transmitter 200 or a tire pressure sensor module. The transmitter 200 may be further configured to transmit the information related to the second characteristic, e.g. information related to the condition of the tire tread, using a subsequent transmit signal. For example, the passive element 300 may influence the characteristic wave impedance of the transmitter 200 such that a current of an amplifier in the transmitter 200 varies based on the influence, enabling the transmitter 200 or the element 400 therein to detect the influence based on said current. These options, transmission, reflection, reception or combinations thereof, may enable presence detection of the passive element 300 or detection of a structural extension of the passive element 300 as for intermediate depth detection of the tire tread.

When the tire 500 gets worn off, at some time a point is reached at which the passive element 300 also wears off or gets detached from the tire 500, e.g. the tread gets thinner and the passive element 300 is lost, as shown in the embodiments depicted in FIGS. 4 and 5. The transmitter 200 and/or the receiver at a control unit 600 may then detect that the transmit signal is not influenced anymore and may generate an according signal or indication based on which a driver or a control unit 600 of the vehicle may be informed.

In an embodiment also detecting intermediate states of the tire tread the structure of the passive element 300 may be reduced in size or in number of structural elements together with the tread, cf. FIG. 5. The passive element 300 may be detached or lose its influence on the transmit signal when the tread wears off to a certain level as well, e.g. as a boundary case or condition. The TPMS transmitter 200, a receiver at an ECU, respectively, may then detect the changing influence on the RF signal as the structural size of the passive element 300 reduces and generate according signals or indications, which may comprise information related to the state of the tire tread, its wear, respectively. Subsequently, said information may then be provided to a driver or control unit 600, or ECU.

In the following an implementation of an embodiment will be further detailed. There are many options on how embodiments of the passive element 300 may be implemented, some use RFID, SAW or BAW. In the following an implementation will be described using an RFID-tag. The passive element 300 comprises or is comprised in an RFID-tag in an embodiment, which modulates a transmit signal transmitted by the TPMS or transmitter 200. For example, some TMPS systems may use 315 MHz and 434 MHz as transmission frequencies and the RFID-tag as embodiment of the passive element 300 is dimensioned adapted or configured to at least one of these frequencies. Suitable antennas at the TPMS transmitter and the RFID-tag may allow the RFID-tag or passive element 300 to be excited with energy emitted by the TPMS transmitter. The RFID-tag as passive element 300 may then modulate, for example using load modulation, the amplitude of the RF signal, which may then be demodulated by, a receiver of a vehicle, ECU or service station in the transmission case, by the TPMS transmitter or the transmitter 200 in the reflection or reception case, respectively.

In some embodiments only the presence of the passive element 300 may be detected or monitored. For example, for as long as the influence or modulation from the RFID-tag is detected (be it at the transmitter or at a receiver), the tire tread depth is still acceptable and a minimal tread depth has not been reached. If the minimal tread depth is reached the RFID-tag or passive element 300 detaches or breaks off the tire tread and the influence or the modulation of the RF-signal is reduced or even ends. The reduced or ended modulation can be detected and according information may be provided to a driver, control unit 600, or ECU. If a receiver at an ECU is used for influence detection such information may be directly provided to a further display or communication unit or device in a vehicle. In case the influence or RF-signal is detected in the TPMS sensor the information related to reaching the minimal acceptable tread depth may be transmitted using TPMS protocols or RF telegrams to receiver at the vehicle, ECU, control unit 600 or service station, and may then be forwarded to a driver of the vehicle using a further communication or display device or unit.

In some embodiment a continuous wear off of the tread of the tire 500 may monitored, a state or degree of the wear off, respectively. In such an embodiment the RFID-tag may comprise a structure, which is embedded in the tear of the tire such that the structure changes as the tread of the tire wears off, cf. FIG. 5. The structure may decrease together with the tire profile or tread. A degree of influence or modulation evoked by the passive element 300 may correlate with the size of the structure.

For example, an ohmic resistance, a capacitance, an inductance, an impedance, etc. may be changed with the wear off of the tire tread and influence the degree of modulation. At the beginning, when a tread depth is maximum, an amplitude of the RF signal may be significantly or maximally attenuated, e.g. the degree of a load modulation may be highest, minimally attenuated and lowest degree of modulation, respectively. As the tread depth decreases the ohmic resistance (alternatively or additionally capacitance, inductance, impedance, any other electric or magnetic property etc.) may be decreased, increased alternatively, and therewith a modulation degree of the load modulation, an attenuation of an amplitude of the RF signal may also be reduced, enhanced, respectively. The passive element 300 may then be configured to at least partially modulate the signal of the transmitter inside the tire 500 in a first wear condition of a tire tread using a first degree of modulation, and to at least partially modulate the signal of the transmitter 200 inside the tire 500 in a second wear condition of the tire tread using a second degree of modulation. In some embodiments the first degree of modulation is higher than the second degree of modulation or the second degree of modulation may equal basically zero.

This difference may be detected (at the transmitter 200 or at the receiver) and evaluated. A driver of a vehicle, ECU or service station respectively, may be provided with information on an intermediate state or degree of wear off of the tire tread on top of the information on a complete wear off as described above.

Figure 6:
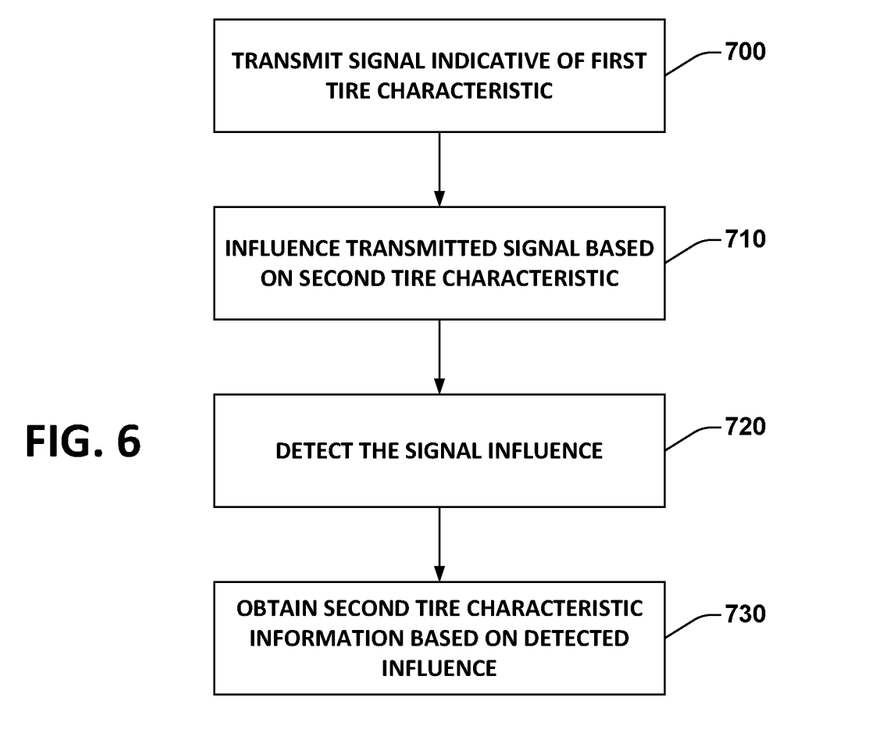
FIG. 6 depicts a block diagram of a flow chart of an embodiment of a method for obtaining information related to multiple tire characteristics.

FIG. 6 depicts a block diagram of a flow chart of an embodiment of a method for obtaining information related to multiple tire characteristics. The method comprises transmitting 700 a signal at least partially indicating a first characteristic of the tire. The method further comprises at least partially influencing 710 the signal based on a second characteristic of the tire. The method further comprises detecting 720 the influence of the signal and obtaining 730 the information related to the second characteristic of the tire based on the influence.

Figure 7:
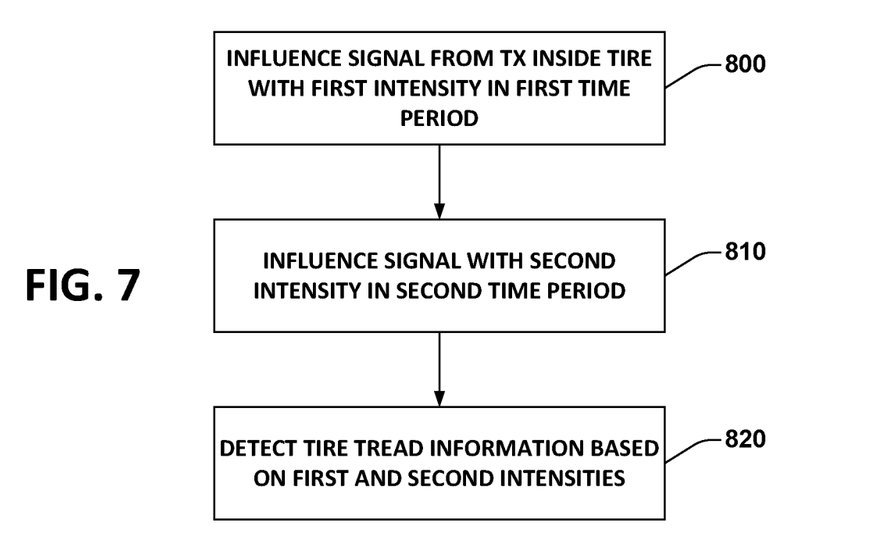
FIG. 7 depicts a block diagram of a flow chart of an embodiment of a method for communicating information related to a condition of a tread of a tire.

FIG. 7 depicts a block diagram of a flow chart of an embodiment of a method for communicating information related to a condition of a tread of a tire 500. The method comprises influencing 800 a radio signal transmitted by a transmitter 200 inside of the tire 500 with a first intensity in a first time period. The transmit signal at least partially indicates a characteristic of the tire different from the condition of the tread of the tire. The method further comprises influencing 810 the radio signal with a second intensity in a second time period, and detecting 820 information related to the condition of the tread of the tire based on the first and second intensities. Embodiments may enable efficient transmission of information related to a second characteristic of the tire using a transmit signal transmitting information related to the first characteristic of the tire. In some embodiments the second intensity may basically be zero.

Another embodiment is a computer program having a program code on a non-transitory media for performing, when the computer program is executed on a computer or on a processor, the above method for providing information related to a pressure of a tire of a vehicle.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", may be provided through the use of dedicated hardware, such as "a processor", "a sensor", "a controller", "a transmitter", "a receiver" etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A device, comprising:
   a transmitter configured to be installed or otherwise located inside a tire to transmit a signal at least partially indicating a first characteristic of the tire; and
   a passive element that is distinct from the transmitter, wherein the passive element is configured to at least partially influence the signal based on a second, different characteristic of the tire.

2. The device of claim 1, wherein the first characteristic and the second characteristic each comprise at least one element of the group of information related to a tire pressure, information related to a condition of a tire tread, information related to a tire temperature, information related to an acceleration of the tire, information related to a friction of the tire, information related to a modulus of elasticity of the tire, information related to a modulus of torsion of the tire, or information related to a bulk modulus of the tire.

3. The device of claim 1, wherein the transmitter is coupled to the element and/or wherein the transmitter comprises a tire pressure sensor module.

4. The device of claim 3, wherein when the transmitter is coupled to the element the element comprises the tire pressure sensor module, wherein the first characteristic comprises information related to a tire pressure, wherein the element is configured to detect a load modulation on the transmit signal based on which the information related to the second characteristic is obtained, and wherein the second characteristic comprises information related to a condition of a tire tread of the tire.

5. The device of claim 1, wherein the element comprises a control unit for a vehicle the tire is attached to.

6. An element configured to detect an influence evoked by a passive element on a transmit signal transmitted by a transmitter configured to be located inside a tire, the transmit signal at least partially indicating a first characteristic of the tire, the influence on the transmit signal being based on a second, different characteristic of the tire, the element being configured to obtain information related to the second characteristic of the tire based on the influence, wherein the element is located within the transmitter.

7. The element of claim 6, wherein the first characteristic and the second characteristic each comprise at least one element of the group of information related to a tire pressure, information related to a condition of a tire tread, information related to a tire temperature, information related to an acceleration of the tire, information related to a friction of the tire, information related to a modulus of elasticity of the tire, information related to a modulus of torsion of the tire, or information related to a bulk modulus of the tire.

8. The element of claim 6, wherein the first characteristic comprises information related to a tire pressure of the tire, and wherein the second characteristic comprises information related to at least one element of the group of information related to a condition of a tire tread, information related to a tire temperature, information related to an acceleration of the tire, information related to a friction of the tire, information related to a modulus of elasticity of the tire, information related to a modulus of torsion of the tire, or information related to a bulk modulus of the tire.

9. The element of claim 6, comprising the transmitter configured to transmit the signal from inside a tire.

10. The element of claim 6, wherein the transmitter is further configured to transmit the information related to the second characteristic using a subsequent transmit signal.

11. The element of claim 6, being further configured to sense the influence of the transmit signal based on a modulation of the transmit signal.

12. The element of claim 6, comprising a control device for a vehicle the tire is attached to.

13. The element of claim 12, wherein the control device is configured to obtain information related to the first characteristic based on the transmit signal from the transmitter inside of the tire, and wherein the control device is configured to obtain information related to the second characteristic based on the influence.

14. A passive element configured to at least partially influence a signal transmitted by a transmitter configured to be located inside a tire, the transmit signal at least partially indicating a first characteristic of the tire, the influence of the signal being based on a second, different characteristic of the tire, wherein the passive element is distinct from the transmitter.

15. The passive element of claim 14, configured to sense information related to a condition of a tire tread, wherein the second characteristic comprises the information related to the condition of the tire tread, and/or wherein the first characteristic comprises information related to a tire pressure.

16. The passive element of claim 14, comprising a radio frequency identification tag, a surface acoustic wave filter or a bulk acoustic wave filter, and/or wherein the passive element is configured to influence the signal using load modulation of the signal transmitted by the transmitter inside the tire.

17. The passive element of claim 14, comprising an antenna, coil or loop.

18. The passive element of claim 14, comprising a structure configured to be located within a tread of the tire.

19. The passive element of claim 18, wherein the structure comprises an electric or magnetic component, which is configured to influence an electric or a magnetic field of the signal transmitted by the transmitter inside of the tire, wherein the structure is configured to change with a change of the wear of the tire, wherein the structure is configured to wear off at least partly together with the tread of the tire, and/or wherein the structure is configured to completely wear off before the tire tread wears off completely.

20. The passive element of claim 14, being configured to at least partially modulate the signal of the transmitter inside the tire in a first wear condition of a tire tread using a first degree of modulation, and to at least partially modulate the signal of the transmitter inside the tire in a second wear condition of the tire tread using a second degree of modulation, wherein the first degree of modulation is higher than the second degree of modulation or wherein the second degree of modulation equals basically zero.

21. A method for communicating information related to a condition of a tread of a tire, comprising:
  influencing a radio signal transmitted by a transmitter inside of the tire with a first intensity in a first time period, the transmit signal at least partially indicating a characteristic of the tire different from the condition of the tread of the tire;
  influencing the radio signal with a second intensity in a second, different time period; and
  detecting information related to the condition of the tread of the tire based on the first and second intensities transmitted in the first and second different time periods, respectively.

22. The method of claim 21, wherein the second intensity is basically zero.

* * * * *